Fig. 1

INVENTOR.
Tyrell T. Gilb
BY
His Attorneys

Sept. 2, 1969     T. T. GILB     3,465,328
INFORMATION CONTROL SYSTEM
Filed Sept. 18, 1967     3 Sheets-Sheet 2

INVENTOR.
Tyrell T. Gilb
BY
His Attorneys

3,465,328
INFORMATION CONTROL SYSTEM
Tyrell T. Gilb, 111 El Camino Real,
Berkeley, Calif. 94705
Filed Sept. 18, 1967, Ser. No. 668,533
Int. Cl. G08b 23/00; G11b 5/00; H04l 3/00
U.S. Cl. 340—324　　　　　　　　　　　　　　　9 Claims

ABSTRACT OF THE DISCLOSURE

An information control system consisting of a submechanism having a rotatably mounted information transmittal member, first and second members mounted for reciprocation and intersecting one another at the submechanism, the members and submechanism being devised to accept input information and to display different information only upon movement of both intersecting members. The submechanisms are primarily devised for mounting a plurality of same in a grid pattern with a plurality of intersecting members arranged for actuating the submechanisms.

---

This invention relates to information control systems, and more particularly to graphic displays created by separate information transmittal members or readouts arranged in visually oriented grid patterns. Specifically, this invention is concerned with a mechanical system of mechanisms capable of selecting and actuating particular readouts in such an information display, with the submechanisms of the readouts inherently capable of performing the memory, logic processing, and selective display functions solely through the mechanical means that concurrently select the particular readout or readouts.

Information display custom has established implicit relationships between readouts, or loci of information, as a function of how they are grouped in a grid pattern. The horizontal, and frequently the intersecting vertical lines of readouts are commonly labeled to confirm and identify the intrarelationship of readouts along such center lines. A particular readout at any intersection thus takes on identity by location. The actual readout information displayed is identified by such coordinates, which usually are called the "address" of such readout information.

Nevertheless, present art and practice does not combine the coordinate locating function with other functions required to produce the desired readout information. Usually signal information is conveyed from associated remote units to the readouts as arranged for visual display. The receiving and display readout contains only elements essential to receiving the signal information and producing visually the indicated readout information. The associated remote units must handle the input, memory, retrieval, logic-processing, and other like functions, then encode desired signals, and selectively address and transmit such signals to desired readouts.

As a consequence, the complexity of such systems and the consequent number of components and associated circuitry systems required tends to be the dependent function of the number of readouts times the number of different display-capacities of each readout, times the number of discrete elements of any logic processing capacity desired times the number of "addresses" potential, times the number of discrete elements in the input system.

In grid information displays of, for example, 100 readouts, the resultant number of such components and circuitry tends to become astronomical. It is kept within possible, if expensive, bounds only by the ingenuity of circuit designers through the use of very sophisticated and expensive sub-components. Even so, display readouts capable of giving compound information, such as a selected symbol over a variable color selection, and of a readout size suitable for middle-distance human viewing, involve costs of a prohibitive order. Vast numbers of such requirements, presently served by manual graphic boards using chalk, attachments, sliding components, or like methods of providing information bits arranged on a labeled grid pattern cannot be automated by the costly alternates available from the current state of the electronic arts.

Consequently, the primary object of this invention is to provide an inexpensive mechanism for this purpose, which is self-contained within an information display board unit that has one relatively thin dimension, and which requires only a simple combined signaling and actuating input.

This purpose creates consequent objectives accomplished by this invention including the ability to select one or more readouts from the many while concurrently selecting and displaying information positionally stored by each of the readout submechanisms, and that has the logic-selective ability required to process the positionally stored information as a concurrent function of that retrieval.

A related object of this invention is to provide means of non-numeric readout information storage at each readout in such a manner that biased, sequential, or priority-related selection may be made by the same mechanical system that selects the particular readout. For example, the mechanical selectors, without requiring feedback information, are capable of actuating the readout into displaying increasing or decreasing degrees, or multiples thereof, of information such as might be conventionally depicted by a readout capacity to display either green, yellow, orange, or red. Further, in this example, in addition to producing the specific readout colors upon mechanical signal, the same mechanical signals are capable of producing a readout that is a response to an existant readout state. In this case, if green were the readout, and the mechanical signals for both yellow and orange were inputed sequentially, the actual readout could be red, reflecting the combined values of the input. In a like manner, if the mechanical signal deducted orange and yellow from a red readout, the resultant readout would be green. In a similar manner, if the readout displays were designed to indicate symbols appropriate to "State-Order-Performance-and Accomplishment," any desired automatic manipulation of the implicit logic-required intra-relationships of such classes of readouts can be accomplished as a direct function of, and at, the readout, as a concurrent consequence of the mechanical selector actuation of that readout.

Another object of this invention is to provide a practical means by which concurrent input of different information can be given to readouts along a group-related line.

Another object of this invention is to provide a mechanism system, the readout components of which may be readily stacked so that two or more readouts, by coaxial or concentric view display, produce composite, related, or intra-dependent information, as in a case such as displaying symbols over a color qualifying background. It is an associated purpose to make it evident and possible for anyone familiar with the art to arrange the essential components described by the illustration of this invention provided herein into multiple configurations thereof in order to provide such multiple capacity readouts, with such expansions in no way changing the scope of this invention. It is a related purpose of this invention, by providing for mechanical selector movement as being the sole required means of selection and actuation, to make it possible to treat any coaxial or concentric readout or other associated readouts as a single information unit collectively responsive to a single input signal source.

Another object of this invention is to provide a basic readout submechanism and the selector drives related thereto that can provide both an absolute selection of any available wanted display, and by the use of the same mechanism provides non-absolute logic-patterned retrieval and display from available positionally stored information.

Another object of this invention is to provide the basic mechanism suitable for obvious extension and modification in respect to provide readout information in other than conventional loci form. For example, the conversion or modification of the readout disc described hereinafter into becoming the driver of a continuous roller strip appropriately oriented toward display front can provide desired information in the readout form of an adjustable bar graph. A closely-related adaption of the above can provide the readout information in the form of a continuous line variable display graph. Given a basic understanding of the mechanism system described herein, anyone skilled in the art can use the ordered movement provided to actuate any desired form of ultimate readout.

A fundamental object of this invention is to provide a total mechanism that accomplishes all the stated objectives of this invention by the use of only mechanical movement. Thus, the function of the system is independent of the means selected to signal-actuate the system. More specifically, this objective limits the total selector and actuation input to being, as derived from any combined signal-actuator source, two intersecting movements. More particularly, these movements are one full-cycle linear reciprocal intermittant movement intersected by one or more selected quater-cycle linear reciprocal intermittant movement. It follows that this permits the required combined signal-actuation to be accomplished by any controllable force: mechanical, electrical, fluidic, electronic, or even manual. The use of electrical circuitry and actuating elements for purposes of the illustration used herein in no way implies the limitation of the application of this invention as being necessarily associated therewith as a means of providing the signal-actuation to the mechanism described.

A further object of this invention is to provide a total system, all essential elements of which operate in relatively slow real time. The full cycle is accomplished in a time span in the order of between one-half second and one second. As, previously stated in other objects, the function is entirely mechanical, no other functions or transfers of state or electronic circuitry of the "ether-and-or" gating nature is needed or requires relative operation time translation provisions as a consequence. As the useful readout change speed of the system described herein approximates that at which the intended human viewer can recognize and retain readout information, any further speed of the mechanism would serve no useful function. As a consequence, all mechanisms have been correlated to the economical speed dictated by the readout purpose.

A related consequent object of this invention is to provide a relatively gross mechanism that can accomplish the sophisticated results desired. All components other than obvious stock-parts exceptions such as pins and bearings can be made very gross tolerances of the order of plus/minus one-sixteenth inch without affecting the performance of the mechanism. Movement tolerances are of the same order. Consequently components are typically inexpensive stampings or moldings. The net result is a very inexpensive mechanism system.

Another object of this invention is to provide a mechanism wherein the sizes of the components therein are not functionally critical except in intrarelationship to each other. As discussed elsewhere, there is a rough correlation between the desired size of the readout and the general scale of the mechanism. A readout size of anywhere between, say, one/half inch diameter and six inches diameter, depending upon the viewing distance desired, provides a basis for appropriately and relatively scaled mechanism, any size of which will work equally well. For purposes of this illustration only, the described mechanism happens to be scaled in relation to a readout of one and three/eighths inch diameter.

Another object of this invention is to provide a system capable of handling any number of readout submechanisms arranged in a grid pattern. However, practical materials considerations such as the length-strength ratio of driving bars tends to limit the practical use of this mechanism to several hundred readouts within a given grid system. However, in the rare cases where more readouts are associatively required, each such practically limited system may become the sub-system of a group of such systems due to the simplicity of the described input system as discussed elsewhere, without limiting the intent, purpose, or scope of this invention. At the other extreme, the minimum number of readouts that utilizes all of the mechanisms and functions required for a system of any number of readouts is four, such as is described hereinafter and illustrated herein. Lesser number of readouts; one, two, or three; utilize the selector and drive mechanism in an identical manner to that described, with the mechanism performing all logic and selective abstracts described. The decreased "selecting" function continues to act as required as the alternate to any clutch-like component requirement.

Another object of this invention is to use the described mechanism system as a master selector device for selective actuating of a grid of switching devices. For example, at the nominal "readout" location switch-like contacts are brought into shorting position with other contacts to close the selected circuit, resulting in a multiple switching device of a high order of logic selectivity. Further, the use of photo-cell type pickups in lieu of the described visual readouts are an additional useful application of this invention by anyone skilled in the art.

A final object of this invention that has broad implications is to provide a basic mechanism that is not limited to the "yes-no" selectivity inherent in electronic systems. This mechanism, as will become evident later, is capable of handling in a direct logic fashion the concept of "yes and no," and manipulatively relating it to information of the order of "yes-no," "yes-yes," "no-no," through the elements thereof with resource to circuitry of the order of "either-and-or" type gate processing. Such concepts as "maybe," and "conditional" may be stored and retrieved by the direct means described, without recourse to another stage or state of electronic circuitry. This invention has taken the end-purpose, the readout, and through the use of the mechanism described herein provides the described system of self-computerized readouts.

Further objects of this invention will become apparent from the following description and from the drawings, which are intended for the purpose of illustration only, and in which.

Numerical identification refers to the identical part, member, or assembly wherever it occurs within any figure or on any figure of this illustration. Lower-case sub-lettered numerical identification is of parts or elements of a numerically identified assembly that are repeated identically on like assemblies. Capital sub-lettered numerical identification refers to identical assemblies so differentiated.

Briefly, the present invention consists of an information control system having a plurality of disposed elongated first members 14A and 14B mounted for reciprocating movement, a plurality of disposed second members 16A and 16B mounted for reciprocating movement and each of said second members intersecting all of said first members, actuator means operatively connected and driving said member, a plurality of submechanisms 17, 18, 19 and 20, one at each of the intersections of said first and second members and having information transmittals as for the example 18d and 20f, signal means as for example 1H, 2H, 1V and 2V operatively connected to said actuator means for selectively actuating said members, and means such as roller 17c mounted on said submechanisms for changing said transmittals responsive to and selectively actuated only upon the combined movements of intersecting first and second members.

Figure 1:
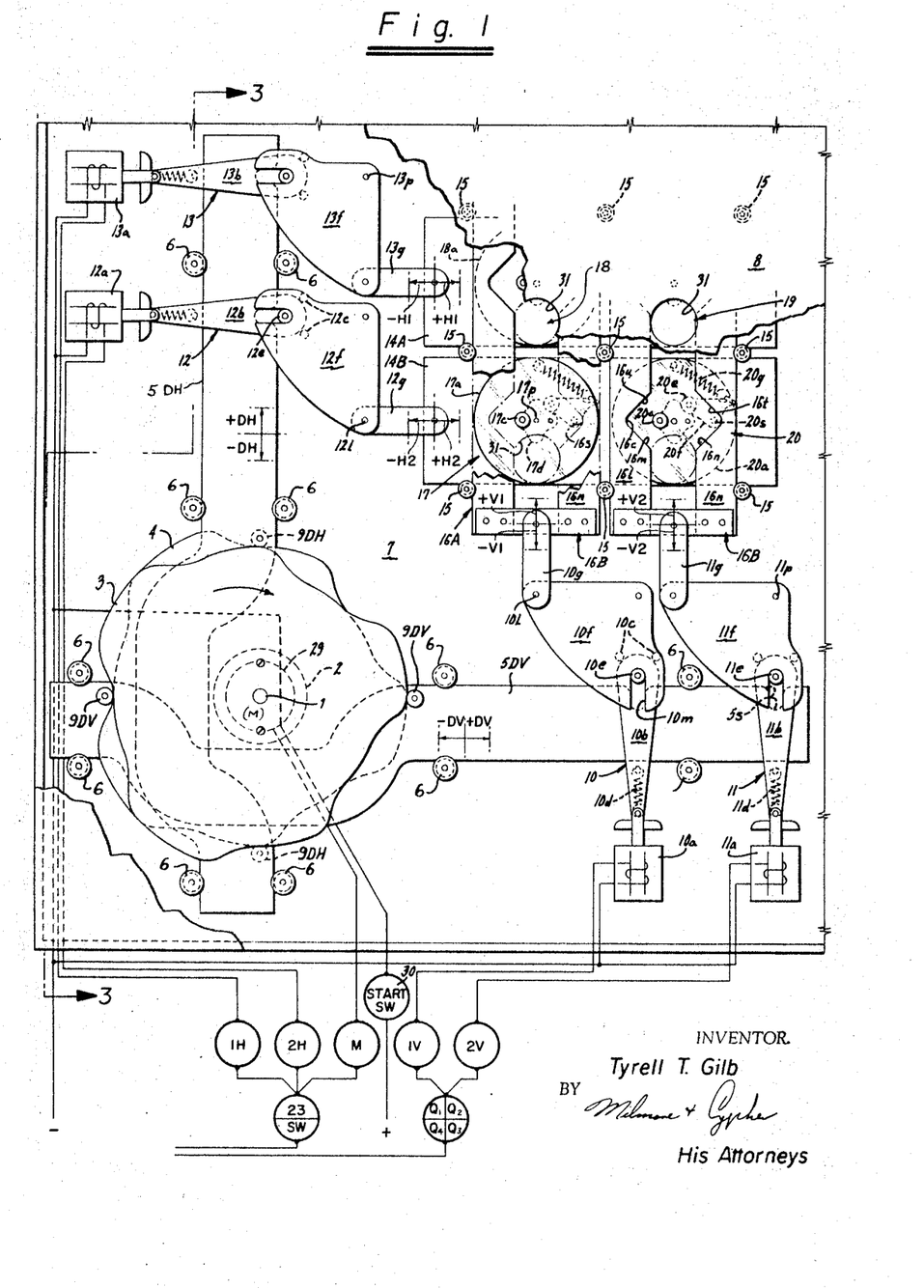
FIGURE 1 is a partial cutaway plan view from the readout front, of the essential drive train, selectors, actuators, and four readout submechanisms.
Figures 2, 3:
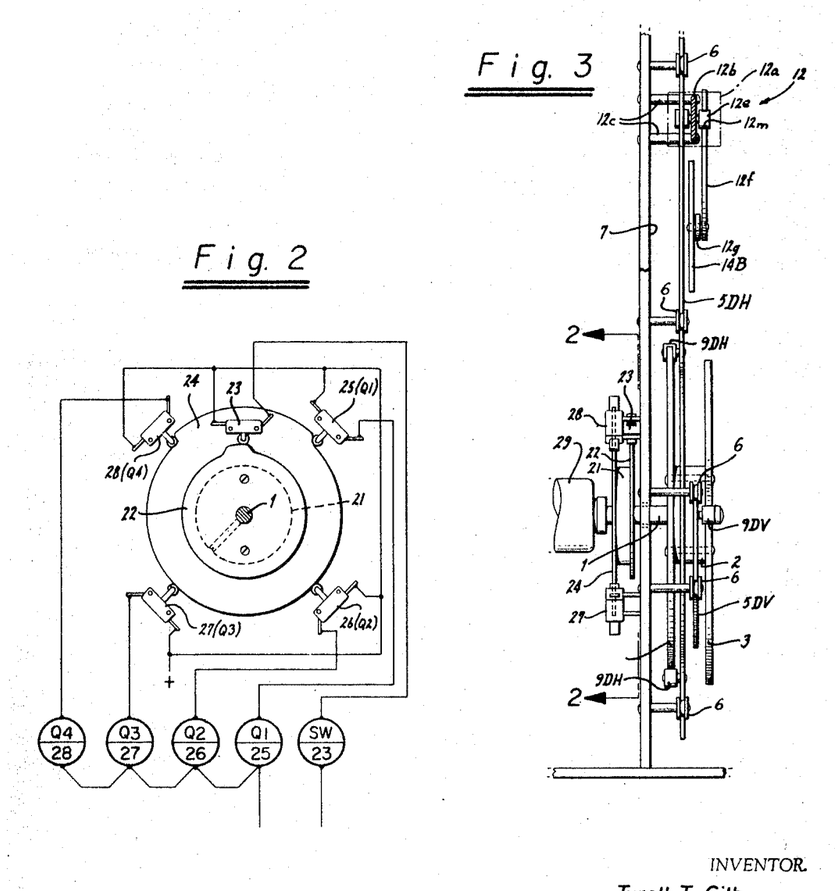
FIGURE 2 is a plan view from the readout front, but viewed beneath the plane of all elements shown on FIGURE 1, of the cam selector and switches concentrically located on the same main drive shaft as in FIGUURE 1.
FIGURE 3 is a partial left end view of the elements shown in FIGURE 1 and FIGURE 2, plus elements disclosed by this viewpoint.

Referring first to FIGURE 1 of the drawings, the primary drive shaft 1 has its axis centerline through the plane of the drawing and is driven rotationally clockwise by an appropriate means such as an electric motor M (not shown) as reduced through a gear box 29 of FIGURE 3 so that the rotational shaft output through the operating cycle of 360 degrees is relatively slow. Also, in the illustrated example, the output shaft 1 is of sufficient cross section, and the gear box 29 provides sufficient strength as a mount to provide together the rigidity required so that the shaft 1 can handle the imposed lateral loads of the cams attached thereto as described later. A rotational output speed of about 60 r.p.m. is recommended for the scaler size of mechanism illustrated, or for any scaler size referred to elsewhere in this description. Speeds as low as 20 r.p.m. or as high as about 200 r.p.m. will also provide a satisfactory real-time prime mover rate for the actuation and operation of the described mechanism, but the particularly best economical balance of associated spring returns and spring actuated detents as discussed later is attained in the recommended 60 r.p.m. range.

The primary drive cams 3 and 4, together with switch cams 22 and 24 in the relative manner and disposed as shown on FIGURE 1, 2, and 3, are coaxially mounted on the shaft 1, and rigidly related thereto and to each other by means such as set-screw hubs 2 and 21.

The primary drive cams 3 and 4 are identical in this illustration, although not necessarily so, as will be understood after reading a description of their function. In this case, being identical, they are rotated 22½ degrees, plus the desired increment of 90 degrees required to provide the desired vertical and horizontal reciprocal linear motion output relationship, as discussed later, to drive bars 5DH and 5DV respectively.

From the 0° position of all mechanism as shown in the illustrations, and particularly in FIGURE 1, the drive cam 3 provides the prime mover force through the cam followers 9DV that are attached to the generally horizontal drive member 5DV, providing linear reciprocal motion thereto, that can be described and understood by reference to the movement diagram shown on the said 5DV member, as movement from 0 to −DV to 0 to +DV to 0 to +DV to 0 to −DV to 0 during a continuous 360° rotation of cam 3.

Concurrently in a like manner the drive cam 4 provides the prime mover force through cam followers 9DH that are attached to the generally vertical drive member 5DH, providing linear reciprocal motion thereto that can be described and understood by reference to the movement diagram shown on the said 5DH member, as movement from 0 to +DH to 0 to +DH to 0 to −DH to 0 to −DH to 0 during the continuous 360° rotation of cam 4.

The particular cams 3 and 4 used in this illustration are identical for reasons of obvious economy. For any reason desired they could be made similar but non-identical, providing the concurrent reciprocal motions then imparted to members 5DV and 5DH maintained the same quadrant relationship to each other as described below, but they need not be in the same quadrant sequence as used herein. During any 90° quadrant subcycle of the 360° full cycle, the linear movement of drive bar 5DH must have reached and been held in the extended dwell position, so that during the time of being so held bar 5DV must move in a linear direction to either of its extended dwell positions; it is further desirable during this subcycle that drive bar 5 DV remain in the extended dwell position while drive bar 5 DH is returned to the 0 position: it further is advisable, as illustrated herein, that drive bar 5DH then remains at dwell position 0 while drive bar 5DV returns to 0 position, completing the essential movement elements of the quadrant subcycle.

The quadrant subcycles are differentiated by the respective plus or minus linear movements of the drive bars in relation each to the other. Within the above definition, four possible combinations of relative directions of linear movement of the respective drive bar members exist. As assigned to particular quadrants by the drive cams 3 and 4 as configured herein, these can be notated as follows:

$$Q1=(+DH-DV), Q2=(+DH-DV)$$
$$Q3=(-DH+DV), Q4=(-DH-DV)$$

These, as is evident by examination, are all possible combinations of plus/minus DH in relation to plus/minus DV.

It is also important that the linear movements of drive bars 5DV and 5DH have relatively smooth acceleration, travel, and deceleration when moving from one position of dwell to the next position of dwell, as provided for by cams such as 3 and 4 designed in accordance with the appropriate art of good cam design. The reason for this will become evident hereinafter.

The drive bar members 5DV and 5DH are identical except for their positional relationship and respective vertical and horizontal linear movement orientation. Both are actuated as previously discussed by cam followers 9 attached thereto. Both are essentially straight line linear bars relatively wide and thin, with offsets provided in the travel area of hub 2 providing linear movement clearance. The distance of plus-minus travel is equal, and the travel of each bar is equal to the other.

For purposes of this illustration only, the plus-minus linear movement of the drive bar members shall be assumed to the plus ¾" and minus ¾" for convenience of comparative movement descriptions hereinafter. The movement diagrams shown on each drive member bar in FIGURE 1 indicates the relative amount of linear movement in scaler relationship to the whole mechanism shown.

The general purpose of both drive bar 5 members is the same: to provide a linear movement actuating-source, appropriately disposed for takeoff engagement by means of actuating selectors 10, 11, 12 and 13, and that further the said drive bars 5 and the movements thereof already represent the factored and intrarelated sequences, approximate distances, direction of travel, and periods of dwells required for further transmittal.

In FIGURE 1, actuating selectors 10 and 11 are disposed for takeoff engagement from drive bar 5DV, and actuating selectors 12 and 13 are disposed for takeoff engagement from drive bar 5DH. Other than being so disposed, the actuating selectors are identical. Solenoid 10a, upon appropriate actuating signal is closed, pulling leaf 10b through a pivot connection thereto away from a rest and stop position 10c, said leaf having been held in that rest position by extended spring 10d except upon the said signal actuation. At the opposite end of leaf 10b from the pivot-connection with the solenoid 10a, rollers or roller-like bearings 10e are concentrically attached above and below leaf 10b. Upon the solenoid 10a actuated movement of leaf 10b, the lower bearing roller 10e engages the drive bar 5 in a slot 5s provided therein and located on drive bar 5 so that when drive bar 5 is in the 0 position the centerline of travel of the roller bearing 10e is also the centerline of the said receiving slot. The concentrically mounted roller bearing 10e on the upper side of leaf 10b is constantly engaged while in rest or actuated position by a slot 10m of travel in pivot-mounted arm 10f. The arm is so configured that in relation to the pivot mount there is a pivot connection 10l with link 10g at 90° relative rotation in respect to the arm 10f pivot mount 10p from the centerline of the constant restraining slot therein, and the distance of both the pivot on the arm 10f and the engaged position of roller bearing 10e are approximately the same so that movement created by drive bar 5 when roller bearing 10e is engaged transmits an equal movement at 90° in respect thereto at the pivot point connecting to link 10g.

As is evident from the movement trains related to actuating selectors 10, 11, 12 and 13, in the particular configuration used in this example the respective plus and minus movements of the drive bars 5 are reversed for conventional expression purposes at the point of travel of the link 10g, 11g, 12g and 13g. In conformity to such convention, all upward or right movements are expressed herein as "plus" movements, and all downward or left movements are expressed as "minus" movements, as further noted on the various movement diagrams on FIGURE 1.

Referring again to FIGURE 1, the actuator selectors 12 and 13, each identical to the actuator selector detailed above, so that when either or both, when signal actuated as detailed above, are engaged with 5DH they will transmit through this means a generally horizontal movement to mount bars 14A and 14B, said bar assemblies being identical, with 14A linkage-associated with actuator selector 13, and 14B being linkage-associated with actuator selector 12. Actuator selector 12 consists of a solenoid 12a connected to leaf 12b, stops 12c, arm 10f, pivot-mounted by pin 12p and connected to mount bar 14B by link 12g. Except for very special purposes as used by someone familiar with the art, as treated in this discussion and illustration, either of these mount bars are selected by the signal means provided at the start of the cycle and remain engaged in respect to 5DH until the end of the full cycle; the movements of drive bar 5DH as previously defined then being exactly reproduced by the selected horizontal mount bar in terms of plus and minus travel and dwells. This movement, as transmitted from either link 13g or link 12g through a pivot connection to mount bars 14A and 14B respectively, can be notated as follows in accordance with the movement diagrams on FIGURES 1 located in respect to the said pivot connections: from 0 to −H to 0 to −H to 0 to +H to 0 to +H to 0

In a like manner, the actuator selectors 10 and 11, identical, when signal-actuated as previously detailed, are then engaged with 5DV and transmit through their respective linkage in the manner described above any desired portions of the cycle potential available to them from the movements available from drive bar 5DV. The main distinction between selectors 10 and 11 and their associated driven members 16A and 16B respectively, in such contradistinction to selectors 12 and 13 discussed above, is that these selectors are primarily concerned with transmitting quarter-cycle elements of the full cycle movement potential available to them upon appropriate actuating signal and consequent engagement with drive bar 5DV. This available movement potential, after transferring through either or both selector actuator assemblies 10 and/or 11 to and through the respective linkages 10g and 11g to their respective points of pivot connection with members 16A and 16B, can be rotated in accordance with the movement diagrams located at said linkage pivot points as follows:

0 to +V to 0 to −V to −V to 0 to +V to 0

The horizontal mount bars 14A and 14B are intersected by the vertical members 16A and 16B, with respective patterns of intermittant movements thereof as defined above. We can now combine the notations of such movements and further group them into the quarter-cycles in which they occur. This, of course, is the identical movement potential available to each and every intersection of the horizontal mount bars 14A–B, and the vertical members 16A–B:

$$Q1=(-H+V), Q2=(-H-V)$$
$$Q3=(+H-V), Q4=(+H+V)$$

In this notation, and in like notations hereinafter, it will be understood that each of these quarter-movements so notated include the previously defined intermittant sequences of dwell and movement, each to the other, as set forth for their primary respective drive bars 5DH and 5DV.

The identical horizontal mount bars 14A and 14B are relatively long, thin and wide flat rectangular members edge-mounted for restrained linear movement in grooved rollers 15, which in turn are appropriately mounted on posts attached to the working base 7. In the mechanism at the scaler size illustrated the roller assemblies 15 are located on the working base 7 at 4″ on center each way, with the said assemblies 15 having identical rollers concentrically mounted on the same posts at an appropriate spacing along the axis of the post to provide the essential support and intersecting linear movement framework for both the horizontal mount bars 14 and the vertical members 16.

The primary function of mount bars 14A and 14B is to provide a mount for the readout submechanisms, 18 and 19 upon bar 14A, and 17 and 20 upon bar 14B, each in fixed relation thereto so that bar 14A moves readout submechanisms 18 and 19 as a whole from the dwell positions through plus or minus movements as previously discussed, as does bar 14B move readout submechanisms 17 and 20 in a like manner. The primary purpose of such movement, as detailed hereinafter, is to bring the readout submechanisms into potential actuating relationship with the intersecting vertical members 16A and 16B.

The elements of the readout submechanisms 17, 18, 19 and 20, together with related details of both the horizontal mount bars 14 and the vertical members 16 are best understood by considering an identical repetitive section at each such intersection, arbitrarily bounded for purposes of description by the centerlines running through the roller assemblies 15, thus forming a description square 4″ on a side. Each such square can be associated with the readout submechanism centered therein, and a description of one is a description of all.

As such a description, as further detailed by lower case lettering on FIGURE 1, the primary portion of the readout submechanism 17 is rotationaly mounted at the center of such a defined square upon a pivot post 17p attached to the horizontal mount bar 14B. The smoothed four-star shaped hub 17d is of sufficient thickness to provide for the associated 90° rotational positioning elements both as to function and clearances with other elements of the submechanism. The circumference of the hub 17d is shaped to provide four equal-spaced indented locations for rotational position holding of the hub 17d and elements in fixed relationship thereto, by the roller 17e, same being extended spring restrained into an indented location on the hub 17d, the said roller 17e being attached to one end of a fulcrum 17f, with the extended spring 17g being affixed to the other end and thence by a means of attachment at the other end to mount bar 14B, the said fulcrum member 17f being also pivot attached by pin 17s to mount bar 14B, so that the relative parts are appropriately disposed to transmit the extended spring 17g pressure as detent force applied through the roller 17e. The hub 17d is further configured so that when sufficient rotational pressure in either rotational direction is transmitted to the hub, then the roller 17e can freely roll over the adjacent projection of the hub into the next indent position, as selected by the rotational angular pressure and direction applied thereto, resulting in a 90° rotational movement of the hub and elements associated in fixed relation thereto.

A relatively thin circular element of relatively translucent material, the readout disc 17a, is attached in fixed relation to the hub 17d on the hub side opposite thereto from that adjacent to mount bar 14B. As illustrated herein, the relative size of readout disc 17a is about 3½" in diameter. For the sole purposes of identifying quadrants of the disc while suggesting relative size of typical symbol readouts, the letters 17b; A, B, C and D, are shown marked on disc 17a, and respectively centered on the radian centerlines of each quadrant of disc 17a, so identified. The letters 17b are further centered in vertical aspect so that their "readout" position roughly centers on the readout centerline 17h as shown on FIGURE 4.

On any quadrant centerline as defined above, (but on the quadrant D centerline as disposed in the illustration), and ¾" out from the rotational center of the hub 17d and 17a assembly center, an actuating roller 17c, approximately ½" in diameter is pivot-mounted for free rotation in such an aspect relationship that the circumference of the roller 17c is in a potential plane of contact with the edges of vertical member 16A. As illustrated herein, the relative position of roller 17c is on top of the readout disc 17a, as dictated by the stacking relationships relative to each other of the mount bar 14B and vertical member 16A and the working base 7, as positioned by the roller assemblies 15. It should be evident that any stacking relationship can be used providing the associative relationships described herein are maintained. It should further be noted that the quadrant identifying letters 17b, A, B, C and D respectively, are meant to represent any four different identities or states or meanings that can be differentiated by visual exposure of a portion of the particular quadrant, or that can convey meaning by any means, direct or indirect, by virtue of the rotational position of the disc 17a or other attachments rotationally activated by the described elements, such as switch contacts in lieu of such a disc 17a, that pass over or contact other circuiting contacts positioned rotationally in fixed disposition in relation to the rotating member. Typical examples of items for which the letters 17b, A, B, C, and D respectively, are meant as representations, are letters, symbols, numerals, colors configurations different degrees of obscurity, different aspects of polarity, or circuit contact switch systems.

Figure 4:
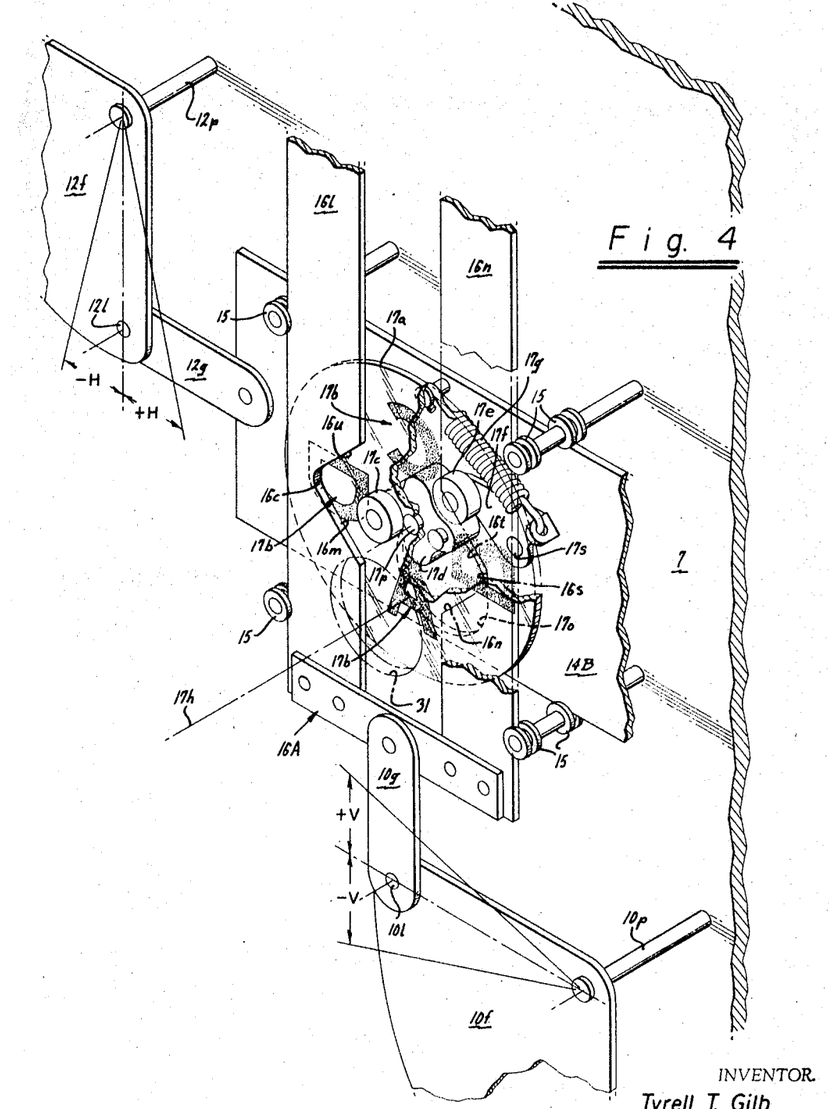
FIGURE 4 is a 30 degree angular cutaway view of one of the readout submechanisms and closely associated members, as typical of all four readouts 17, 18, 19 and 20 indicated by FIGURE 1, differing only insofar as the associated members depicted identifies the particular readout as being readout 17.

Referring to FIG. 4, this drawing shows a preferred means of visual differentiation of the rotational position of the readout disc 17a by the use of a readout locus 31 through a relatively obscure readout face, so disposed in the illustration that only a part of the quadrant A is visible. At the scale illustrated, the readout passage is about 1¼" in diameter. For applications benefiting from backlighting, or wherein mixed or composite readout information is best displayed through two or more concentrically mounted readout submechanisms, (most conveniently so as mirror-image configurations of the same elements mounted on opposite sides of the mount bar 16B with an appropriate vertical member 16A "stacked" in relation thereto and actuated by a chain of drive source and selection substantially identical to that described herein for a single layer device), or for reasons of desired brightness, signal transmittal, or any other reason for alignment of a light source located on the working frame 7 that provides illumination along readout axis 17h, then in such cases a passage hole 17o can be provided in mount bar 14B, said hole centered on the readout axis 17h and of a size approximating the readout loci hole 31.

In the particular rotational position of readout disc 17a shown, quadrant A is in the visual readout position, and the actuating roller 17c is disposed along the centerline of quadrant D to the left of the disc 17a center, with the said centerline also being the centerline of the mount bar 14B. For purposes of illustration only this rotational disposition shall be assumed to be disclosing, as readout quadrant A, the most neutral information; or, if preferred, the starting readout position, or information.

If the rotationally affixed readout submechanism 17 is moved to the left by the affixed movement of the mount bar 14B for a distance of ¾"—that is, a previously described —H movement, then the perimeter of the actuator roller 17c is brought into contact with an edge 16c of the left element 16l of the vertical member 16A, the said particular edgeport of contact being at the centerline through an angular cutout in the said vertical member 16A that has a depth therein, and a radius at the apex of such angular cutout, just sufficient as a combined consideration to permit the travel of actuator roller 17c the said ¾" therein while the said roller 17c remains in the same relative aspect to the readout sub-mechanism 17 as a whole, to a positional condition of the said roller 17c just touching the radius at the apex. If, then, in such a position of "dwell" as imposed by the affixed mount bar 14B's cycle as elsewhere defined, the actuating roller 17c will be moved clockwise by an upward movement of the vertical member 16A—elsewhere defined as a +V movement thereof, or counterclockwise by a downward movement of vertical member 16A,—elsewhere defined as a —V movement thereof. If, during the movement and consequent dwell of the mount bar 14B, with particular reference to the fixed position relationship thereto, unless otherwise actuated, of the roller 17c, and no movement occurs by the vertical member 16A, then the mount bar 14B returns to its 0 position without any rotational movement or consequent 90 degree rotational positional shift having occurred in the readout submechanism 17. The potential of the above movements can be notated as follows:

$$QA+(-H+V)=QB, \; QA+(-H-V)=QD$$

$$\text{and } QA+(-H+\text{nul } V)=QA$$

when the QA, QB, etc. stands for the particular quadrant in terms of beginning and ending readout position, and the $(+H+V)$ stands for respective movements as previously defined.

With the readout submechanism in the same rotational position, that is QA, but a +H movement is imposed upon the readout assembly 17, then the roller 17c is moved ¾" to the right to a dwell position. As can be noted by reference particularly to FIG. 1, this does not result in any contact with the right hand element of the vertical member 16, said right hand element having a mirror-image cutout along the same centerline as described for the left hand element. As a consequence, movements +V or —V of the member 16, with clearances provided for that purpose between the left and the right elements of vertical member 16, does not have a consequent rotational movement imparting to roller 17c. This can be similarly notated as: $QA+(+H\pm V)=QA$. In a related manner, by obvious examination, it can be notated that: QA, QB, QC, or $QD+(\text{nul } H\pm V)=QA$, QB, QC, or QD: that is, no rotational change results under the stated movement condition. In a like manner, given the clearances noted on the illustrations, it can also be notated that: QA, QB, QC, or $QD+(\pm H \text{ nul } V)=QA$, QB, QC, or QD: that is, no rotational change results under the stated movement conditions.

The two stated notations immediately above define the basis upon which the described mechanism selects any readout out of a grid assembly of such readout submechanisms by two intersecting movements while avoiding any actuating relationship to any other submechanism readouts even though same are along the line of either intersecting movements. As notated above, unless both movements occur in respect to any particular readout assembly, then the readout cannot be rotationally changed by any one movement. By definition, of course, a vertical and horizontal movement in a grid of any size can only intersect at one location.

In a like but opposed rotational position of the readout submechanism 17, wherein the C quadrant is at the readout position, and the actuator roller 17c is on the right, 180 degrees from the previously described rotational position and consequent movements, the then consequent notational statement of movements and consequent rotational action can be made as follows:

$$QC+(+H+V)=QB$$

$QC+(-H+V)=QC$, and $QC+(-H-V)=QC$, and, of course as previously discussed, when either the H or V movement is nul, then no change occurs in rotational position: $QC+(+H-V)=QD$.

When the readout disc 17a is in rotational position so that the actuator roller 17c is on the centerline that is parallel to the actuating member, in this illustrated case being actuating member 16, and with the roller 17c being located on a vertical centerline with a consequence of either QB or QD being in readout position at axis 17h, then a different consequence of movements and resultant rotation of the readout assembly occurs. For purposes of illustration assume that the QD is at readout position at 17h, and the roller 17c is associatively located 90 degrees from its position as shown, at a downside position in relation to the centerpoint of the disc 17a and on the vertical centerline thereof. Upon +H movement of the mount bar 14B, together with the affixed readout assembly 17 with particular reference to actuator 17c that does not move from its rotational position in respect thereto, and the movement is the defined ¾", then the perimeter of the roller 17c just makes tangent contact with the lower leg of the angular cutout at an approximate midpoint 16m or 16n thereof, with the said cutout having been so devised that the acute angle of the sides thereof is just sufficient to provide a tangent contact between the edge of the leg of the angular cutout and the circumference edge of roller 17c at such point of maximum travel. If, when the roller 17c is in such a dwell position, a +V movement is made by the vertical member 16A, then in a cam-like manner the angular edge of the cutout imposes an angular force upon roller 17c, which acting in a follower-like respect thereto, rotates the disc 17a in a clockwise direction to readout position QA. Consequent returns to 0 position by members 14 and 16 are as previously described.

When like circumstances occur and like movements occur up to the point of roller 17c being in the dwell position, but that then a −V movement is made by the vertical member 16A, then the angular cutout side that is in tangent contact with roller 17c leaves such contact without imparting motion thereto, and at the limit of such downward movement of the vertical member 16A the opposed side of the acute angle comprising the angular cutout just comes into tangent contact with the roller 17c at approximately a like midpoint 16u thereon of the angular leg, said angular leg configuration and dimensions in respect to the roller and the given travel of ¾" of member 16A creating exactly the travel distance required for the roller 17c, when in the extended dwell position; that is, to have the one tangent contact removed and the other imposed. Consequent returns to 0 position by members 14B and 16A are as previously described, with no rotational movement having been imparted by the vertical member 16A to the roller 17c.

In a like manner, when movement −H of the mount bar occurs, a like but opposed result occurs. In a like manner when QB is at readout 17h, and the roller 17c is relatively disposed upwards, then there is a like but mirror-image result thereof to that described above. Vertical member 16A is formed with a right element 16r having an angular cut out defined by an apex 16s, an upper side 16t and a lower side 16n. More specifically, both like movements and consequences and rotational readout consequences thereof can be best described by the following notations in accordance with prior definitions thereof:

$$QD+(+H+V)=QA, \ QD+(+H-V)=QD$$
$$QD+(-H+V)=QC, \ QD+(-H-V)=QD—$$
$$QB+(+H+V)=QB, \ QB+(+H-V)=QA$$
$$QB+(-H+V)=QB, \ QB+(-H-V)=QC—$$

and, to re-state the other possible movements at this point, as previously discussed, in the same form for comparative analysis:

$$QA+(+H+V)=QA, \ QA+(+H-V)=QA$$
$$QA+(-H+V)=QB, \ QA+(-H-V)=QD—$$
$$QC+(+H+V)=QB, \ QC+(+H-V)=QD$$
$$QC+(-H+V)=QC, \ QC+(-H-V)=QC$$

It will be readily apparent by mathematical analysis or direct operational examination that the above basic sequential relationships of every possible movement input (four), or a total of sixteen such relationships, can be recombined by the selective quarter input signal actuation as hereinafter defined into unique and useful combinations of positional memory, plus logic manipulation thereof, for a high order of readout potential.

Some of the more useful such retrievals from the positional memory storage at each readout that can be accomplished while concurrently performing certain logic-sorting functions thereon, while also concurrently selecting the particular readout, all by a simple two-movement response to equivalent signal input, are as follows:

When a particular readout is wanted, irrespective of whatever readout is displayed, the following movement inputs always result in the wanted readout being retrieved to the readout axis h position. $(+H+V)+(+H-V)=A$, $(+H+V)+(-H+V)=B$, $(-H+V)+(-H-V)=C$ and $(+H-V)+(-H-V)=D$. Further, these respective quadrant movements need not be in the sequence given.

Another useful building-block for logic-controlled readout output are the following relationships:

QA plus any single-quarter input never results in QC
QB plus any single-quarter input never results in QC
QC plus any single-quarter input never results in QA
QD plus any single-quarter input never results in QB The rotational quadrant readout positions have an inherent additive and subtractive intra-relationship. By combining the movement values in the above tables, it becomes apparent that quantative relationships such as the following can be used: $QA+(-H+V)=QB$, and $$QA+(-H-V)=QD$$

and also the same quarter-cycle movements combined, that is, $(-H+)+(-H-V)=QC$, thus $QB+QD=QC$. In a like manner, using the summary resultant readouts of particular quarter-cycle values as the notation, typical orders of relationships as the following exist:

$$QA+(QB+QD)=QC, \ QC+(QB+QD)=QA$$

Another very useful characteristic that permits direct signal transfer from add to subtract is the fact that the reversal of all signs in a particular group (as directly expressed as a reversal of the signal-actuated linear movements) constitutes a reversal, or assigned negative positional value to one readout quadrant in respect to another, as the added or subtracted sum of the other two quadrant readouts. For example, $(+H-V)+(+H+V)$ equals QA, which can thus be opposed as the opposite end of a scaler order of values to QC, with the values of QD and QB ordered in between for direct qualitative memory retrieval of such ordered values, or any combinations, ascensions or reclensions of same.

The above, and numerous other like readout relationships are input by a combination signal-actuating system whose essential elements are as follows:

FIG. 2 shows the cam-actuated switch system devised to provide the necessary signal and actuating power source control in respect to the actuating time and quarter-cycle incidence and duration required for each application in respect to the full 360 degrees movement of the basic cycle. This, together with the essential circuitry and resultant actuated components shown on FIG. 1 shows one simple method of such a factoring of the required actuation-signal system into the minimum components that favors a very simple input requirement.

As is evident from the description of the mechanism thus far, the essential movements actuating movements that must be provided are: first, a means of providing 360 degree rotation to shaft 1, with appropriate signal means provided to start and stop that rotation at approximately the same 0 degree rotational position; secondly a means of signaling and actuating one of the mount bars 14 for a full-cycle ±H movement as derived from the ±DH of drive bar 5DH, and thirdly a means of intermittant signaling-actuating, for selected 90 degree cycle durations, the movement of one or more actuator members 16, by making connection between same and the movement potential of drive bar 5DV for each such quarter-cycle selected.

The illustrated method of accomplishing the above is as follows:

Referring to FIG. 1, switches 1H or 2H, and switches 1V and/or 2V are closed as an input function. This is the total addressing function required. Any of the switches 25, 26, 27, and/or 28 are closed as input defining the desired logic programming such as outlined in an earlier section. A momentary switch 30 is then closed to provide a temporary source of over-ride current to the motor to start the cycle.

Referring to FIG. 2, a separate source of electrical power is available as noted through the cam-actuated switches as shown. A few degrees of rotation resulting from actuation by the closing of momentary switch 30 then results in cam 22 actuating switch 23 creating therethrough a closed circuit with the motor and either 1H or 2H circuits and thence to solenoids 13a or 12a respectively and maintains that circuit unit switch 23 is opened by the cam action 22 when it again reaches the point of beginning.

In the meantime, cam 24 is successively closing for each sequential 90 degrees of rotation, and then opening, each of the quarter-dwell switches 25, 26, 27, and 28, which are respectively circuited through input controlled switches 25, 26, 27, and 28 respectively, and thence collectively through either/or both input-selected switches 1V and/or 2V and thence to solenoids 10a or 11a respectively, which thus actuated, provide the desired consequent actuation connection as previously described.

For input operational examples of the above, first assume that the readout disc 17a is in the illustrated rotational position, with quadrant 17A on the readout axis 17h. Further assume that different information, as might be depicted by quadrant 17B, is desired as display on the readout axis 17h.

For all examples given it will be assumed that readout 17 is the desired readout to be actuated. This portion of the input is the desired readout to be actuated. This portion of the input is accomplished by closing switches 1V and 2H on FIG. 1, which thereby selects for actuation the respective horizontal and vertical members which, as previously described, determines readout intersection 17 as being the only possible respondee to the potential signal-actuated train of consequent mechanical movements. This is the complete input "dressing."

For the first example it is assumed that input knowledge includes the fact that quadrant 17A is in readout position. As a consequence, the only additional input requirement is the closing of switch Q1/25 on FIG. 2. This provides the +V movement of the vertical member 16A during the portion of the first quarter of the cycle when mount member 14B is in the minus dwell position as previously described.

With the above inputs established, the momentary closing of switch 30 on FIG. 1 starts the cycle. This accomplishes the sole change desired of rotating the disc 17 assembly so that quadrant 17B moves to the readout position. As above noted, this occurs during the the first quarter-cycle, when intersection occurs. The other ¾ of the cycle constitute unintersected movement by the horizontal mount bar 14B until the cycle is stopped at the original point of rotation beginning by the opening of switch 23 on FIG. 2 by cam 22 action.

For an identical example—other than assuming the information represented by readout quadrant 17D is wanted instead of Q17B, all of the above inputs and sequences apply except that —V movement instead of +B movement of the vertical member 16A is wanted when mount member 14B is in the minus dwell position. This defines the second quarter-cycle. Therefore switch Q2/26 on FIGURE 2 is closed instead of Q1/25, with the desired readout consequences obtained in the above described manner.

A different kind of example is the assumption that input-related knowledge does not include information as to just what readout quadrant is being displayed, but in any event wants, say Quadrant 17B to be displayed at axis 17h.

The "addressing" input remains as described. Prior notation tables shows that $(-H+V)+(+H+V)$ movements are required to produce Quadrant 17B at display readout axis 17h. The tables also define these notations as being movements of the first and fourth quarter-cycles at the point of members intersection. Therefore, switches Q1/25 and Q4/28, on FIGURE 2 are closed as input. The consequent closing of momentary switch 30 and the full-cycling as previously described moves Quadrant 17B to readout axis 17h from any random position found. If it is already in the readout display position, it so remains.

In a like manner, any of the other three quadrants are moved to readout axis 17h from random positions by the closing of the input switches related thereto, in accordance with previous notation tables.

A further type of input example that illustrates basic additive, comparative, or cumulative uses of the system is as follows: again assume readout 17 to be addressed as described above, further call Quadrant 17A the "neutral" readout information, Q17B to be a symbol telling that an "order" has been given about something represented by the particular readout, with Q'7D being information that "performance," or at least action has taken place, and Q17C displaying the information symbol meaning that performance, as ordered, has been accomplished.

In previous examples it was noted that the action of the first quarter-cycle as a function of QA resulted in QB at readout, and the action of the second quarter-cycle as a function of QA resulted in QD at readout. It it also previously detailed and notated that $$(-H+V)+-H-V)=QC$$

absolute. These are the notations for the first and second quarter-cycles respectively. We can therefore briefly notate that $B+D=C$ as a function of the A at readout position $h$.

While this relationship is useful and in the manner previously described can be used as an input guide to an input additive readout meanings directly, it becomes far more useful when it is also noted that the described mechanism automatically rejects any input unrelated to this relationship if so programmed. The notation tables show that input actuating either subcycle 3 or 4 when Quadrant A is at readout axis $h$ is ignored. Duplicating input is also ignored.

As a particularly useful consequence, the described system can, without input knowledge as to readout position, input "plus" type information in respect to meanings such as assigned in this illustration, and/or "minus" type information with concurrent or sequential correct arithmetic or logic readout-positioning response. For detailed example when using such assigned meanings: assume that Quadrant 17C is at readout axis $17h$ displaying information previously defined as meaning that an ordered performance has taken place. Further assume that the "order" element is desired deleted. The resultant desired readout information should then be the unmodified fact of "performance" only. Referring to previously defined tables of notations and assigned equivalents, then if the displayed readout is Q17C, then Q17D is the desired "performance only" readout.

However, it was also stated that any input having an inherent deductive change intent, (or for that matter, any input having an additive change intent), cannot violate any logic or arithmetic relationships if the readout happens to be at QA, QB, or QD instead of QC. The basic input value has to be $(+H-V)$, subquarter 3, in accordance with the tables defining QD as the resultant readout as a function of QC being at readout $h$. Nevertheless, the sole input permitted is the closing of switch Q3/27 as the means of saying "deduct the order or authorization."

If the readout was displaying QC, the resultant QD would occur as above discussed. The same tables show that if the readout happened to be QA, or the "neutral position" in this programming, it would remain so as the correct logic response: obviously no "order" could be deducted from a status of non-order. If it were in readout display position QB, meaning "order only," it would remove that correctly to "neutral" display position QA. If it were in "performance only" position QD, it would remain so.

In a like manner subquarter cycle 4, $(+H-V)$, can be assigned as the sole input valve for negating "performance," with like logic and arithmetic correctness of resultant readouts irrespective of random readout position unknown to the input. As previously discussed, subcycle quarters 1 and 2 can in a like manner be assigned sole input meanings of plus for each element of the programed meanings assigned to the readout as noted.

Given such basic input requirements that automatically result in complex orders of logic as a function of this readout mechanism it is possible to recombine them in many additional ways as should now be evident in order to handle programming in a far simpler manner than possible with conventional "yes-no" systems.

The simplicity of the combined signal-actuating system thus described permits very complex programming through the simple input selection defined, due to the direct factoring of all functions by mechanical means down to movements requiring direct input signals combined with the actuation thereof as irreducible original input information. As should be again noted, all of the above discribed inputs are constants irrespective of the number of readouts in a particular system, or the complexity of the programming. The start-stop cycle control is a constant. The addressing selection by the input selection of one H related circuit and one V related circuit is a constant. The particular programming desired is always a simple selector function of input to the four Q circuits.

That is the total of it, easily adapted by anyone familiar with the art to any desired input system such as punch-card, tape, direct console control, interface transfer, or manual.

I claim:
1. An information control system comprising:
 (a) a plurality of disposed elongated first members mounted for reciprocating movement,
 (b) a plurality of disposed second members mounted for reciprocating movement and each of said second members intersecting all of said first members,
 (c) actuator means operatively connected and driving said members,
 (d) a plurality of submechanisms one at each of the intersections of said first and second members and having information transmittals,
 (e) signal means operatively connected to said actuator means for selectively actuating said members, and
 (f) means mounted on said submechanisms for changing said transmittals responsive to and selectively actuated only upon the combined movements of intersecting first and second members.

2. An information control system as described in claim 1 and comprising:
 (a) a second system as described in claim 1 wherein said transmittals are information readouts and a readout of both systems may be simultaneously perceived producing composite and intra-dependent information.

3. An information control system as described in claim 1 wherein:
 (a) said first members are mounted for movement between first, center and second positions,
 (b) said transmittals are rotatably mounted on said first members for movement therewith,
 (c) said second members are mounted for movement between first, center and second positions, and have actuating members,
 (d) said means being mounted on said submechanisms so as to coact with said actuating members only when said first members are in said first or second positions, and said second member is moved from center to first or second positions, and being further mounted so as to clear said actuating members when said first members are in said center position.

4. An information control system as described in claim 3 wherein: each of said transmittals have a display area divided into four quadrant areas, and means for holding said transmittal in each of said quadrant areas until further actuated.

5. An information control system as described in claim 4 comprising:
 (a) cam means carried by said second members having angularly related cam edges,
 (b) a cam follower mounted on each of said submechanisms and positioned so as to engage one of said cam edges upon movement of one of said first members to said first and second positions and to rotate one of said transmittals as a function of initial position of said cam follower, position of said first member and direction of movement of said second member.

6. An information control system as described in claim 4 comprising:
 (a) means selectively driving one of said first members two cycles from center to first position and two cycles from center to second position for each complete input cycle,
 (b) means selectively driving one of said second members two cycles from center to first position and two cycles from center to second position for each complete input cycle,
 (c) cam means carried by said second member consisting of first and second opposed V-shaped cam faces having their apexes on an axis and the legs of the V opening to one another, and
 (d) a cam follower mounted on each of said submechanisms positioned so as to engage the apexes of said V-shaped cams or the midpoints of the legs of said V's for each movement of said first members and rotating or not rotating said transmittals as a function of initial position of said cam follower, position of said first member and direction of movement of said second member.

7. An information control system as described in claim 4 comprising:
 (a) a first cam member mounted for rotation,
 (b) a first drive member having a cam follower mounted for engagement with said first cam member, and having longitudinally spaced open ended slots formed therein,
 (c) first actuator members pivotally mounted and having protrusions dimensioned for movement into and out of said first drive member slots,
 (d) first pivot arm members pivotally coupled to said first actuator members and to said first members for reciprocating movement as programmed by said first cam member,
 (e) a second cam member mounted for rotation,
 (f) a second drive member having a cam follower mounted for engagement with said second cam member, and having longitudinally spaced open ended slots formed therein,
 (g) second actuator members pivotally mounted and having protrusions dimensioned for movement into and out of said second drive member slots, and
 (h) second pivot arm members pivotally coupled to said second actuator members and to said second members for reciprocating movement as programed for said second cam member.

8. An information control system as described in claim 7 including:
 (a) means for selectively moving said actuators into and out of engagement with said drive members,
 (b) quarter cycle dwell switches connected to said means having cam followers and,
 (c) a dwell cam mounted for rotation for actuating said dwell switches.

9. In an information control system:
 (a) a first member mounted for reciprocating movement between first, center and second positions;
 (b) a rotatably mounted member positioned on said first member for movement to preselected rotated positions and having a face providing an information display at each of said rotated positions;
 (c) a second member mounted for reciprocating movement between first, center and second positions and mounted in angular relation to said first member;
 (d) first engaging means mounted on said rotatable member;
 (e) second engaging means mounted on said second member and selectively engaging said first engaging means as a function of said initial preselected rotated position of said rotatable member, said first and second positions of said first member and the direction of movement of said second member; and
 (f) control means operatively connected to said first and second members for selectively moving said members for effecting rotation of said rotatable member to preselected positions.

References Cited
UNITED STATES PATENTS

| | | | |
|---|---|---|---|
| 2,885,658 | 5/1959 | Marcellus | 340—174 |
| 3,098,223 | 7/1963 | McNaney | 340—347 |
| 3,191,167 | 6/1965 | McNaney | 340—347 |
| 3,248,700 | 4/1966 | Sinn | 340—152 |
| 3,391,274 | 7/1968 | Avery | 235—92 |

STEPHEN J. TOMSKY, Primary Examiner

U.S. Cl. X.R.

235—61, 145; 340—174, 347